(12) United States Patent
Subramanian et al.

(10) Patent No.: US 10,403,875 B2
(45) Date of Patent: Sep. 3, 2019

(54) BUSBAR ASSEMBLY FOR VEHICLE TRACTION BATTERY

(71) Applicant: Ford Global Technologies, LLC, Dearborn, MI (US)

(72) Inventors: Rajaram Subramanian, Ann Arbor, MI (US); Francisco Fernandez, Canton, MI (US); Stuart Schreiber, Dearborn Heights, MI (US); Tommy M. Gunther, Canton, MI (US); Yunan Guo, Rochester Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 622 days.

(21) Appl. No.: 14/685,888

(22) Filed: Apr. 14, 2015

(65) Prior Publication Data
US 2016/0308187 A1    Oct. 20, 2016

(51) Int. Cl.
  *H01M 2/20* (2006.01)
  *H01M 2/30* (2006.01)
(52) U.S. Cl.
  CPC .......... *H01M 2/206* (2013.01); *H01M 2/305* (2013.01); *H01M 2220/20* (2013.01)
(58) Field of Classification Search
  None
  See application file for complete search history.

(56) References Cited

U.S. PATENT DOCUMENTS

| | | | |
|---|---|---|---|
| 6,023,146 A | 2/2000 | Casale et al. | |
| D636,727 S | 4/2011 | Sakae | |
| D646,637 S | 10/2011 | Sakae | |
| 2010/0173178 A1* | 7/2010 | Kim | H01M 2/06 429/1 |
| 2011/0159353 A1* | 6/2011 | Byun | H01M 2/206 429/160 |
| 2011/0195296 A1* | 8/2011 | Kim | B23K 26/32 429/151 |
| 2011/0287299 A1* | 11/2011 | Kim | H01M 2/1077 429/158 |
| 2012/0115015 A1* | 5/2012 | Park | H01M 2/1061 429/159 |
| 2012/0121966 A1* | 5/2012 | Kim | H01M 10/0436 429/158 |
| 2012/0177978 A1 | 7/2012 | Kim et al. | |

(Continued)

FOREIGN PATENT DOCUMENTS

JP    2007-323952    * 12/2007 .............. H01M 2/10

*Primary Examiner* — Amanda J Barrow
(74) *Attorney, Agent, or Firm* — David B. Kelley; Brooks Kushman P.C.

(57) ABSTRACT

A vehicle traction battery assembly including a pair of battery cells and a busbar is provided. Each of the battery cells may include a terminal and one or more locating features. The busbar may span between the cells and define a pair of arms each having a member sized to at least partially interlock with the one or more locating features. The busbar may span between the cells such that the busbar covers at least a portion of upper surfaces defined by each of the cells. At least one of the terminal apertures may be spaced in between outer edges of the respective arms such that a first and second surface area provide space sufficient for weld spots.

6 Claims, 5 Drawing Sheets

(56) References Cited

U.S. PATENT DOCUMENTS

| | | | |
|---|---|---|---|
| 2012/0288744 A1* | 11/2012 | Guen | H01M 2/206 |
| | | | 429/158 |
| 2013/0130572 A1* | 5/2013 | Sakae | H01M 2/206 |
| | | | 439/884 |
| 2013/0330595 A1 | 12/2013 | Lee et al. | |
| 2014/0205888 A1* | 7/2014 | Kim | H01M 2/206 |
| | | | 429/158 |
| 2014/0308568 A1* | 10/2014 | Kim | H01M 2/30 |
| | | | 429/158 |
| 2014/0356691 A1* | 12/2014 | Ahn | H01M 2/305 |
| | | | 429/158 |
| 2016/0149191 A1* | 5/2016 | Farha | H01M 2/206 |
| | | | 429/121 |
| 2016/0172649 A1* | 6/2016 | Morgan | H01M 2/206 |
| | | | 429/90 |

* cited by examiner

_Fig-5A_

_Fig-4_

BUSBAR ASSEMBLY FOR VEHICLE TRACTION BATTERY

TECHNICAL FIELD

This disclosure relates to busbars and busbar assemblies holders for vehicle traction batteries.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain an energy storage device, such as a high voltage (HV) battery, to act as a propulsion source for the vehicle. The HV battery may include components and systems to assist in managing vehicle performance and operations. The HV battery may also include one or more arrays of battery cells interconnected electrically between battery cell terminals and interconnector busbars.

SUMMARY

A vehicle traction battery assembly includes a pair of battery cells and a busbar. Each of the battery cells has a terminal and a pair of ridges on either side of the terminal defining a valley therebetween. The busbar spans between the cells and defines a pair of arms each having a trough member sized to sit within one of the valleys and a terminal aperture to receive one of the terminals such that the busbar electrically connects the terminals. The trough member may define a height greater than a height defined by the ridges. The busbar may span between the cells such that the busbar covers at least a portion of upper surfaces defined by each of the cells. The busbar may further include a tab defining a volumetric area based on a predetermined amount of electrical current to flow therethrough. At least one of the terminal apertures may be spaced in between outer edges of the respective arms such that a first and second surface area provide space sufficient for weld spots on either side of the terminal aperture. Each of the arms may further define a clamp zone spaced apart from the respective trough members to receive a clamping load. The pair of ridges and busbar may be shaped to at least partially interlock with one another.

A vehicle traction battery assembly includes two battery cells and a busbar. Each of the battery cells has a terminal and a first raised portion. The busbar is sized to cover at least a portion of each of the cells and defines a second raised portion and a pair of apertures each sized to receive a portion of one of the terminals. The dimensions of the portions are such that the busbar interlocks with the cells when the terminals extend through the terminal apertures. The first raised portions may each define a height greater than a height defined by the second raised portion. The busbar may further define a pair of cutouts opposite one another and located at a central region of the busbar. At least one of the pair of apertures may be spaced apart from an outer edge of the busbar such that a first and second surface area on either side of the aperture provide space for weld spots. The apertures and raised portions may be arranged with one another to promote flush contact between a surface of the busbar and an upper surface of the battery cells.

A vehicle traction battery assembly includes a pair of battery cells, a pair of flanges, and a busbar. Each of the battery cells has a terminal and defines a first mount feature proximate to the terminal and a first locating feature. Each of the flanges defines a second mount feature, a first locating feature, and a first terminal aperture. The busbar defines a second locating feature having a second terminal aperture. The mount features are arranged with one another such that each flange partially interlocks with a corresponding battery cell, and the locating features are sized to promote flush contact between the flanges and busbar only when the terminals extend through the apertures in registration with one another. The first mount feature may be a pair of pins extending from the cell and the second mount feature may be a pair of pin apertures sized to receive the pins. The first locating feature may be a pair of extrusions defining a valley therebetween and the second locating feature may be a member sized for disposal within the valley to promote electrical communication between the terminals. The first locating feature may be a raised portion and define a mountain and the second locating feature is a cap for the mountain. The shape of the second mount feature may be based on contours of at least one of the battery cells. The first locating feature may define a height relative to at least one of the battery cells which is less than a height defined by the second locating feature relative to the at least one of the battery cells.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
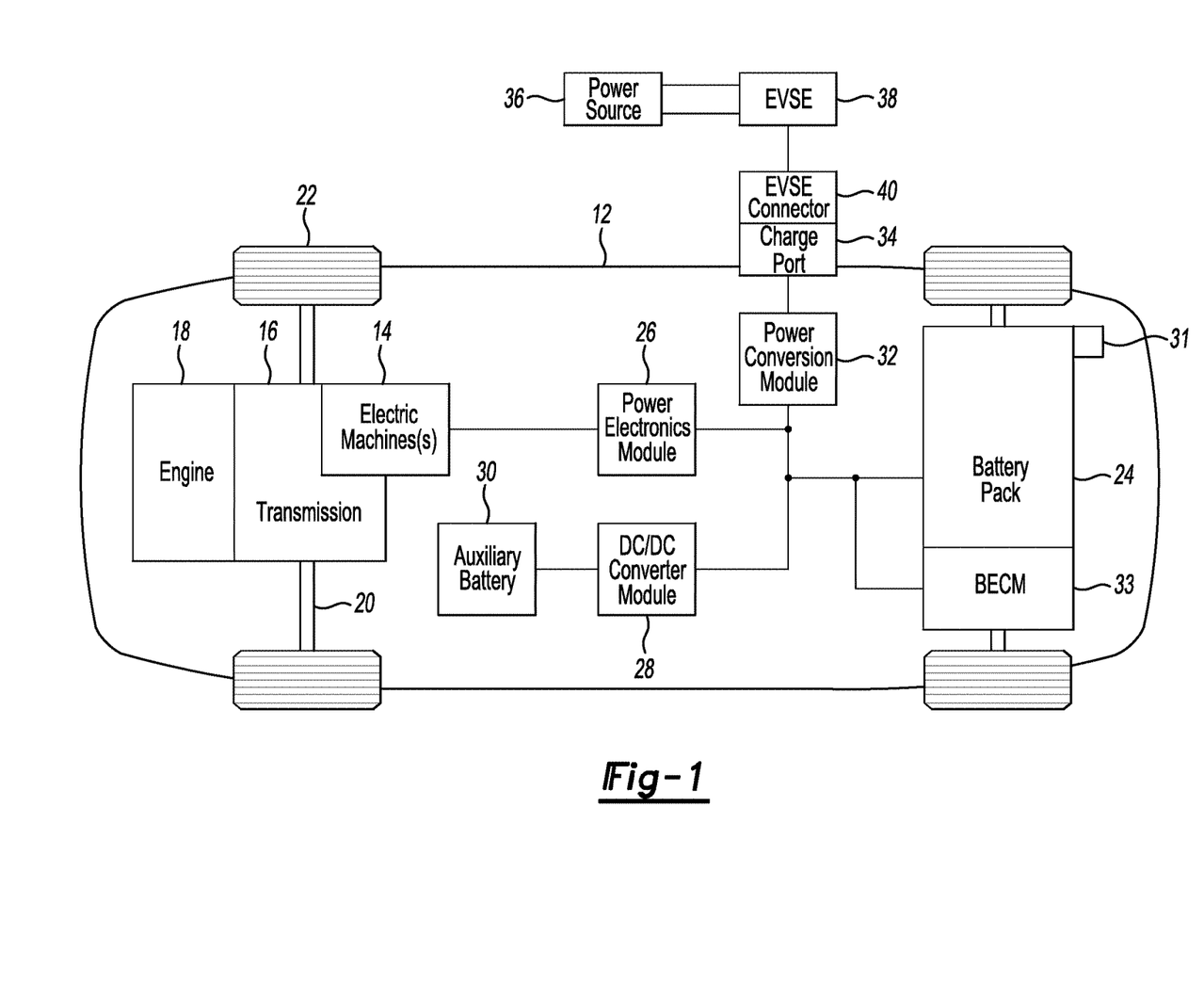
FIG. 1 is a schematic diagram of an example of a battery electric vehicle.

FIG. 1 depicts a schematic of an example of a plug-in hybrid-electric vehicle (PHEV). A vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 may also act as generators and can provide fuel economy benefits by recovering energy that would normally be lost as heat in the friction braking system. The electric machines 14 may also provide reduced pollutant emissions since the vehicle 12 may be operated in electric mode or hybrid mode under certain conditions to reduce overall fuel consumption of the vehicle 12.

A traction battery or battery pack 24 stores and provides energy that can be used by the electric machines 14 or other vehicle 12 components. The traction battery 24 typically provides a high voltage DC output from one or more battery cell arrays, sometimes referred to as battery cell stacks, within the traction battery 24. The high voltage DC output may also be converted to a low voltage DC output for applications such as vehicle stop/start. The battery cell arrays may include one or more battery cells. The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle or other hybrid vehicles. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells. The traction battery 24 may be heated and/or cooled using a liquid thermal management system, an air thermal management system, or other method as known in the art.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural support components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

Figure 2:
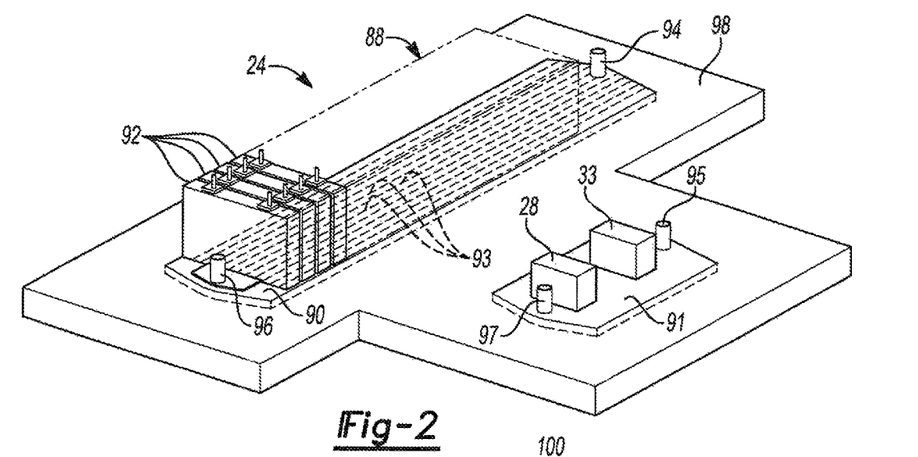
FIG. 2 is a perspective view of an example of a portion of a traction battery and a thermal management system.

In one example, the battery cell array 88 may be mounted to the thermal plate 90 such that only one surface, of each of the battery cells 92 is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell arrays 88 may be positioned at any suitable location in the vehicle 12.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

Figure 3A:
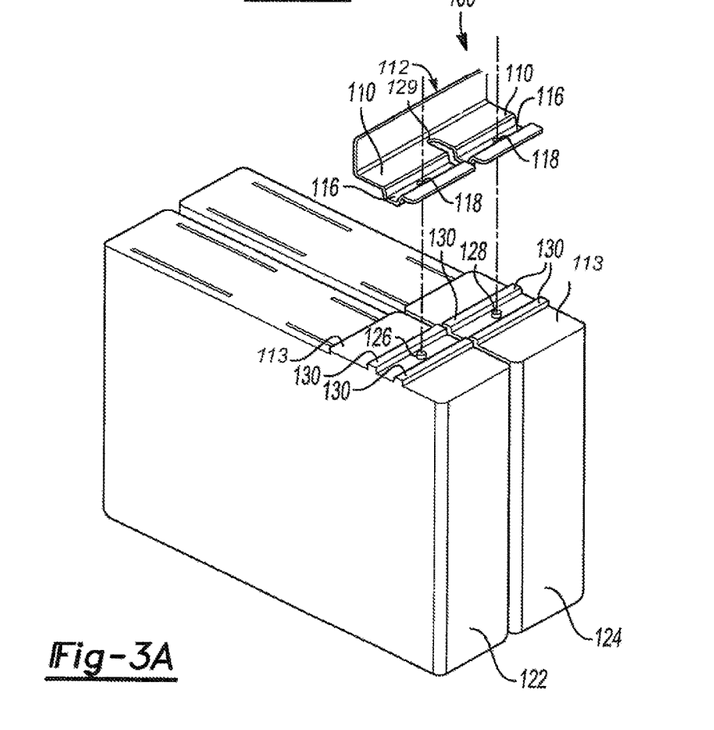
FIG. 3A is an exploded, perspective view of an example of a busbar assembly and a pair of battery cells.
Figure 3B:
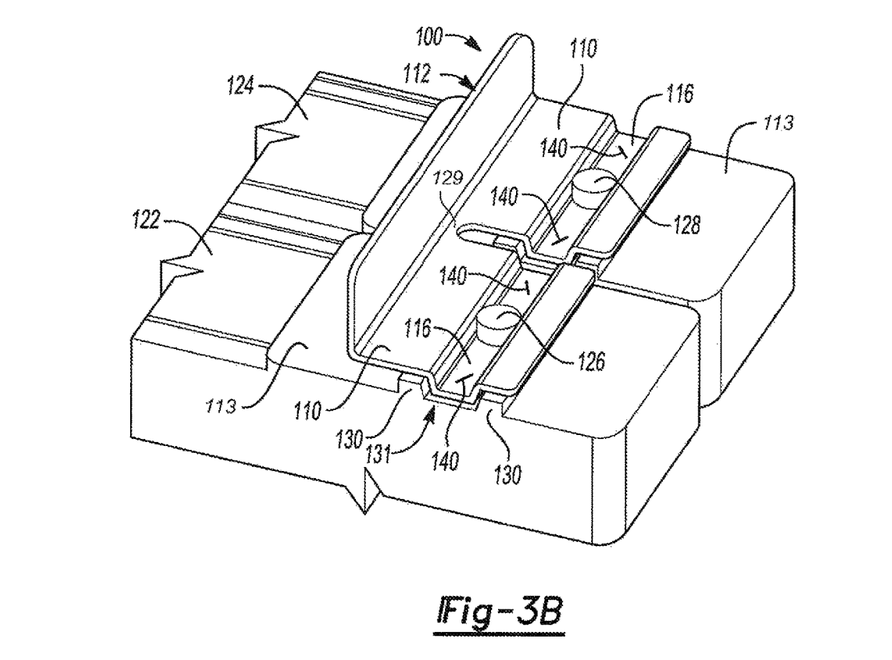
FIG. 3B is a perspective view of the busbar assembly of FIG. 3A shown mounted to the pair of battery cells of FIG. 3A.
Figure 3C:
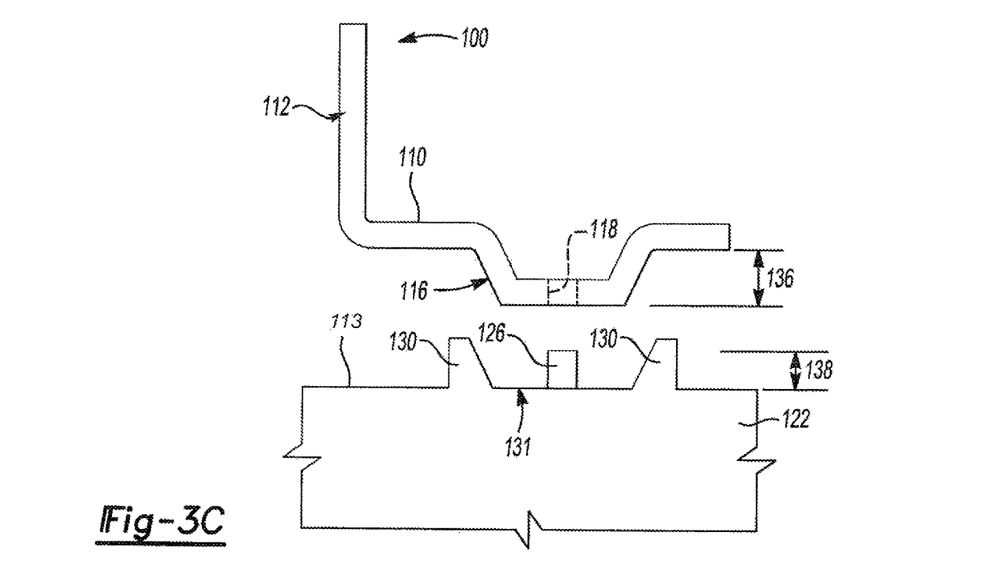
FIG. 3C is a side view, in cross-section, of a portion of the busbar assembly and the pair of battery cells of FIG. 3A.

FIGS. 3A through 3C show an example of a busbar and a pair of battery cells for use with a vehicle traction battery assembly. A busbar 100 may include features to assist in electrically connecting adjacent battery cells and to assist in facilitating a laser weld operation to secure the busbar 100 to terminals of the battery cells. For example, the busbar 104 may include a pair of arms 110 and a vertically oriented tab 112. Each of the arms 110 may define a member 116 and a terminal aperture 118 therein. Each of the arms 110 may directly extend from a same side of the vertically oriented tab 112 and may be oriented parallel with an upper cell surface 113 The member 116 may also be referred to as a trough or weld member herein. The vertically oriented tab 112 may extend in a first vertical direction relative to the arms 110. It is contemplated that the vertically orientated tab 112 may have other configurations in accordance with a surrounding environment and/or packaging constraints. For example, the vertically orientated tab 112 may extend at an angle relative to the arms 110 or may extend in a second vertical direction relative to the arms 110. The vertically orientated tab 112 may define a volumetric area based on a predetermined amount of electricity which will flow between terminals of battery cells.

The busbar 100 may span between a first battery cell 122 and a second battery cell 124 to at least partially cover an upper face defined by each of the battery cells. The first battery cell 122 includes a first terminal 126 and the second battery cell 124 includes a second terminal 128. In this example, each of the arms 110 may be directly adjacent one another forming a horseshoe shape. It is contemplated that in other configurations the arms 110 may be connected to one another, may define a single component, or may be of another shape. A horseshoe shape of the busbar 100 may assist in providing flexibility of the busbar 100 to accommodate for varying heights of adjacent battery cells. An arc portion 129 may be defined between the arms 110. The busbar 100 may assist in conducting electricity between the first terminal 126 and the second terminal 128. The bus bar 100, the first battery cell 122, and the second battery cell 124 may include features to assist in locating one another and to facilitate weld operations during installation.

For example, the first battery cell 122 and the second battery cell 124 may each define a pair of features 130 spaced apart from one another and located on either side of the respective terminal. The features 130 may also be referred to as ridges or extensions herein. The pair of features 130 may define a valley 131 sized to receive the respective members 116 of the busbar 100. Various shapes and forms of the pair of features 130 may be available. For example, the features 130 may define triangular prism shapes about the respective terminals. Under certain conditions, the pair of features 130 may only partially extend across the respective battery cell or the pair of features 130 may define other shapes such as triangular prisms. In order to facilitate a proper weld, it may be preferable for the busbar 100 to directly contact and be substantially flush with a surface of the valley 131. The size and shape of the member 116 and the valley 131 may be such that each member 116 partially interlocks with the valley 131. The member 116 may be sized such that space is provided on either side there of as a clamp zone to facilitate a clamping operation during installation. The size and shape of the member 116 and the valley 131 may be such that the member 116 contacts a lower surface within the valley 131 and between the features 130 to assist in facilitating an electrical connection between the first terminal 126 and the second terminal 128.

For example and as shown in FIG. 3C, a height of each member 116 may be represented by a distance 136. A height of each feature 130 may be represented by a distance 138. The distance 136 may be a height greater than the distance 138 to ensure the member 116 contacts the surface within the valley 131. Each member 116 and each of the respective features 130 may further be shaped to facilitate a partially interlocking relationship to assist in locating one another during installation. For example, portions of each member 116 may be shaped to mirror portions of the respective features 130.

A location of the terminal apertures 118 on the arms 110 may further assist in locating the busbar 100 to the battery cells and in facilitating the weld operation therebetween. The terminal apertures 118 may be sized to receive the respective first terminal 126 and the second terminal 128 such that the members 116 may be oriented for insertion within the respective valleys 131. With regard to assisting in facilitating weld operations, the terminal aperture 118 may be spaced in between edges of the respective arm 110 to provide sufficient space for a weld spot, such as laser weld spots 140 which are represented by hash marks in FIG. 3B. Other forms of welding which may secure the busbar 100 to the first battery cell 122 and the second battery cell 124 include resistance, ultrasonic, and spot. The location of the terminal apertures 118 may also provide sufficient space for the weld spots 140 to accommodate a regression or subsequent weld in the event of a failed initial weld.

Figure 4:
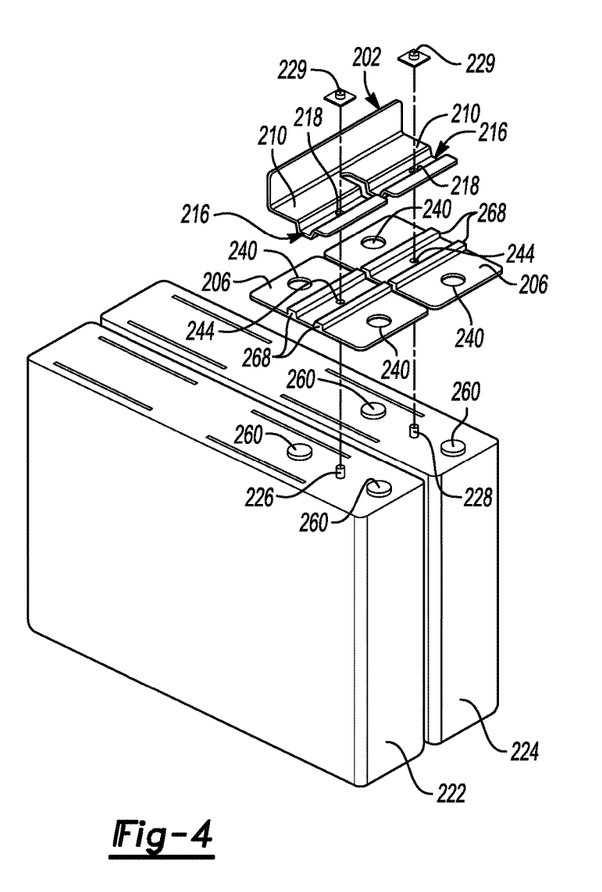
FIG. 4 is an exploded, perspective view of an example of a busbar assembly and a pair of battery cells.

FIG. 4 shows another example of a busbar and a pair of battery cells for use with a vehicle traction battery assembly. In this example, a busbar assembly may include a busbar 202 and a pair of flanges 206. The busbar 202 may define a pair of terminal apertures 218 sized to receive terminals and a pair of arms 210 each having a trough member 216. The busbar assembly, a first battery cell 222, and a second battery cell 224 may include locating features to assist in securing the busbar assembly to the battery cells. For example, each flange 206 may define a first set of apertures 240 and a second set of apertures 244. It is contemplated that multiple configurations of the first set of apertures 240 and the second set of apertures 244 are available. In this example, the first set of apertures 240 may be defined such that pins 260 of the first battery cell 222 and the second battery cell 224 may extend therethrough. The second set of apertures 244 may be defined such that a first terminal 226 and a second terminal 228 of the respective battery cells may extend therethrough. Terminal caps 229 may be configured to cover the respective terminals thereunder. The busbar 202 and each flange 206 may be arranged with one another such that the respective terminal apertures 218 are in at least partial registration with the second set of apertures 244 to receive the first terminal 226 and the second terminal 228 therethrough.

Each flange 206 may further define a locating feature to assist in mounting the busbar 202 thereto. For example, the flange may define two sets of features 268. The features 268 within each set may be spaced apart from one another and sized to receive the respective trough member 216 of the busbar 202. The terminal apertures 218 may be located within the respective trough member 216 such that adequate space is provided on either side of the terminal apertures 218 to facilitate a weld as described in the examples above. The flanges 206 may have multiple configurations adaptable to various battery cells which may not include locating features molded or integrated therein.

Figure 5A:
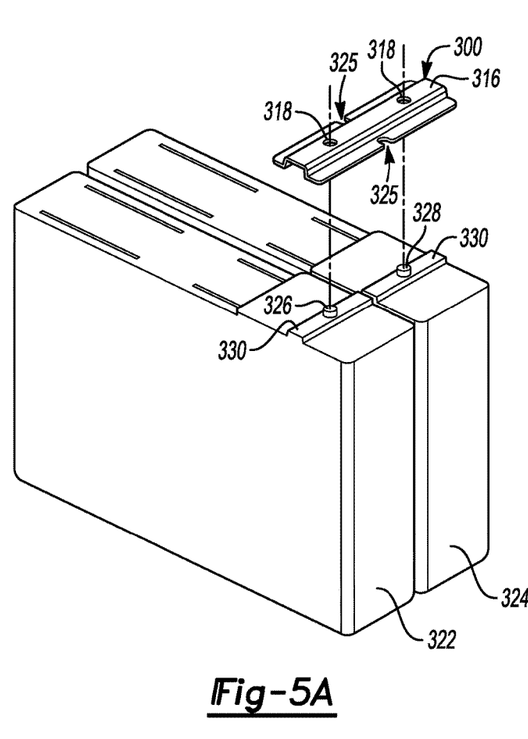
FIG. 5A is an exploded, perspective view of an example of a busbar assembly and a pair of battery cells.
Figure 5B:
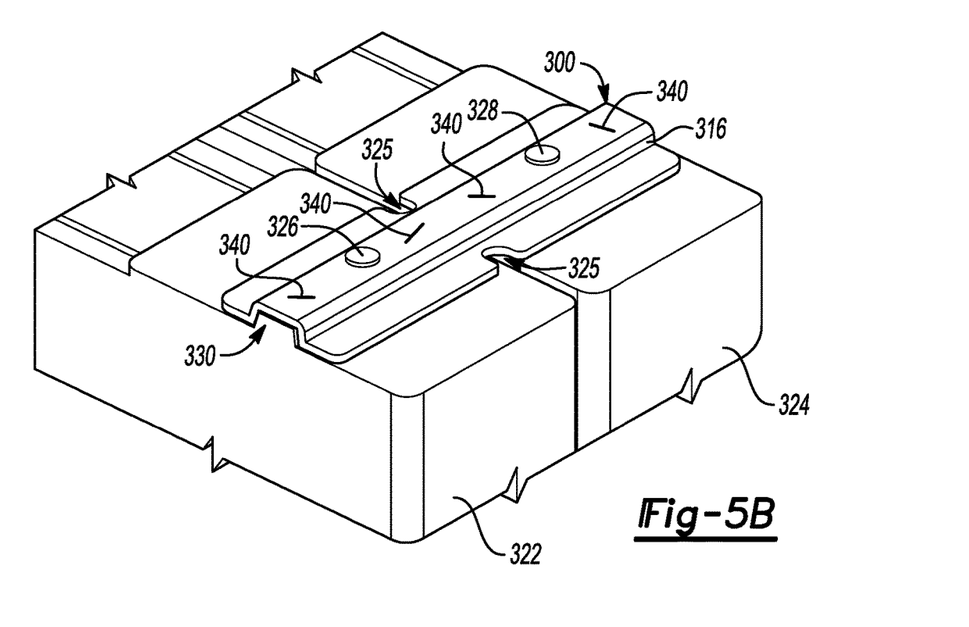
FIG. 5B is a perspective view of the busbar assembly of FIG. 5A shown mounted to the pair of battery cells of FIG. 5A.
Figure 5C:
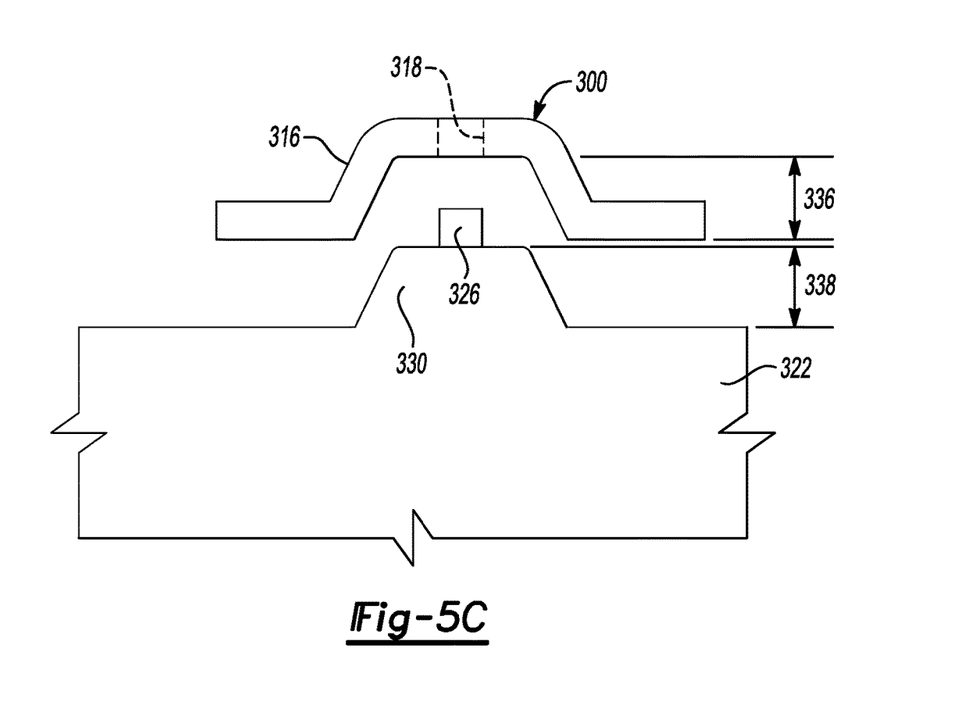
FIG. 5C is a side view, in cross-section, of a portion of the example of the busbar assembly and the pair of battery cells of FIG. 5A.

FIGS. 5A through 5C show another example of a busbar and a pair of battery cells for use with a vehicle traction battery assembly. A busbar 300 may include features to assist in electrically connecting adjacent battery cells and to assist in facilitating a laser weld operation to secure the busbar 300 to terminals of the battery cells. For example, the busbar 300 may include a raised portion 316 and may define a pair of terminal apertures 318. The busbar 300 may span between a first battery cell 322 and a second battery cell 324 to at least partially cover a face of each of the battery cells. In this example, the busbar 300 defines two cutouts 325 to assist in providing flexibility of the busbar 300 to accommodate for varying heights of adjacent battery cells.

The first battery cell 322 includes a first terminal 326 and the second battery cell 324 includes a second terminal 328. The busbar 300 may assist in conducting electricity between the first terminal 326 and the second terminal 328. The bus bar 300, the first battery cell 322, and the second battery cell 324 may include features to assist in locating one another and to facilitate weld operations during installation. For example, the first battery cell 322 and the second battery cell 324 may each define a feature 330, such as a mountain feature, located in line with the respective terminal. The feature 330 may define an extension or ridge sized for supporting the raised portion 316 of the busbar 300. Various shapes and forms of the feature 330 may be available. Under certain conditions, the feature 330 may only partially extend across the respective battery cell or the feature 330 may define other shapes such as triangular prisms.

In order to facilitate a proper weld, the busbar 300 may directly contact and be substantially flush with a surface of the feature 330. The size and shape of the raised portion 316 and the feature 330 may be such that the raised portion 316 partially interlocks with the feature 330. The size and shape of the raised portion 316 and the feature 330 may be such that the raised portion 316 and the feature 330 partially interlock to assist in facilitating an electrical connection between the first terminal 326 and the second terminal 328.

For example and as shown in FIG. 5C, a height of the raised portion 316 may be represented by a distance 336. A height of the feature 330 may be represented by a distance 338. The distance 338 may be greater than the distance 336 to ensure the raised portion 316 contacts a surface of the feature 330. The raised portion 316 and the feature 330 may further be shaped to facilitate a partially interlocking relationship to assist in locating one another during installation. For example, portions of the raised portion 316 may be shaped to mirror portions of the respective feature 330.

A location of the terminal apertures 318 on the busbar 300 may further assist in locating the busbar 300 to the battery cells and in facilitating the weld operation therebetween. The terminal apertures 318 may be sized to receive the respective first terminal 326 and the second terminal 328 such that the raised portions 316 may be oriented to receive the respective feature 330. With regard to assisting in facilitating weld operations, the terminal apertures 318 may be spaced in between edges of the busbar 300 to provide sufficient space for a weld spot, such as laser weld spots 340 which are represented by hash marks in FIG. 5B. Other forms of welding which may secure the busbar 300 to the first battery cell 322 and the second battery cell 324 include resistance, ultrasonic, and spot. The location of the terminal apertures 318 may also provide sufficient space for the weld spots 340 to accommodate a regression or subsequent weld in the event of a failed initial weld.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle traction battery assembly comprising:
   a pair of battery cells each having a pair of integrally formed ridges defining a valley with a terminal therebetween; and
   a busbar spanning between the cells and defining arms each directly extending from a vertically oriented tab with a trough to sit within one of the valleys,
   wherein the arms are parallel with a respective upper cell surface and directly adjacent one another forming a horseshoe shape.

2. The assembly of claim 1, wherein each of the troughs defines a height greater than a height defined by the ridges.

3. The assembly of claim 1, wherein the busbar spans between the pair of battery cells such that the busbar covers at least a portion of upper surfaces defined by each of the cells.

4. The assembly of claim 1, wherein the vertically oriented tab defines a volumetric area based on a predetermined amount of electrical current to flow therethrough.

5. The assembly of claim 1, wherein each of the arms further comprises a terminal aperture spaced in between outer edges of respective arms such that a first and second surface area provide space for weld spots on either side of the terminal aperture.

6. The assembly of claim 1, wherein each pair of integrally formed ridges and the busbar are shaped to at least partially interlock with one another.

* * * * *